US006301566B1

(12) United States Patent
Costello

(10) Patent No.: US 6,301,566 B1
(45) Date of Patent: Oct. 9, 2001

(54) DEVICE AND METHOD FOR OBTAINING RETAIL PRICE INFORMATION IN DIFFERENT LANGUAGES FROM A COMPUTER VIA TELEPHONE

(76) Inventor: Jan M. Costello, 215 Woodland Ct., Safety Harbor, FL (US) 34695

( * ) Notice: Subject to any disclaimer, the term of this patent is extended or adjusted under 35 U.S.C. 154(b) by 0 days.

(21) Appl. No.: 09/419,541

(22) Filed: Oct. 18, 1999

(51) Int. Cl.[7] .................................................. G06F 17/60
(52) U.S. Cl. ...................... 705/26; 379/88.05; 379/88.06
(58) Field of Search .............................. 379/67.1, 88.05, 379/88.06; 705/1.26

(56) References Cited

U.S. PATENT DOCUMENTS

| 4,135,662 | * | 1/1979 | Dlugos | 235/304 |
|---|---|---|---|---|
| 4,584,648 | * | 4/1986 | Dlugos | 364/464 |
| 4,595,980 | * | 6/1986 | Innes | 704/8 |
| 4,992,940 | * | 2/1991 | Dworkin | 705/26 |
| 5,009,276 | * | 4/1991 | Raikes et al. | 177/25.15 |
| 5,155,849 | * | 10/1992 | Westfall et al. | 707/203 |
| 5,220,501 | * | 6/1993 | Lawlor et al. | 364/408 |
| 5,353,335 | * | 10/1994 | D'Urso et al. | 379/88.05 |
| 5,404,580 | * | 4/1995 | Simpson et al. | 455/89 |
| 5,615,301 | * | 3/1997 | Rivers | 704/277 |
| 5,832,459 | * | 11/1998 | Cameron et al. | 705/26 |
| 5,839,117 | * | 11/1998 | Cameron et al. | 705/27 |
| 5,841,852 | * | 11/1998 | He | 379/201 |
| 5,870,724 | * | 2/1999 | Lawlor et al. | 705/42 |
| 5,890,139 | * | 3/1999 | Suzuki et al. | 705/27 |
| 6,038,292 | * | 3/2000 | Thomas | 379/88.06 |
| 6,069,939 | * | 5/2000 | Fung et al. | 379/67.1 |

FOREIGN PATENT DOCUMENTS

| 0961455 | * | 12/1999 | (EP) . | |
| 04-306947 | * | 10/1992 | (JP) | 379/201 |
| 08-256368 | * | 10/1996 | (JP) . | |
| 09-65424 | * | 3/1997 | (JP) . | |

OTHER PUBLICATIONS

"GTE Airfone Introduces Ground–To–Air Telephone Services to Airlines". Land Mobile Radio News, Dec. 17, 1993, v47, n48.*

"GTE Airfone Successfully Tests Ground–To–Air Telephone Calls; Announces Launch Of New Service In Early 1994": PR Newswire, Jan. 18, 1994.*

"Dynamic Management of Resources for Different National Languages": IBM Technical Disclosure Bulletin, Sep. 01, 1997, vol. 40, num.9, pp. 171–*174.*

* cited by examiner

Primary Examiner—Edward R. Cosimano
(74) Attorney, Agent, or Firm—Dennis G. LaPointe; Mason & Associates, PA

(57) ABSTRACT

The present invention is a device and method for obtaining retail price information from different stores using a touch-tone telephone, whereby the information is stored in a computer and is available to the user in different languages.

20 Claims, 2 Drawing Sheets

DEVICE AND METHOD FOR OBTAINING RETAIL PRICE INFORMATION IN DIFFERENT LANGUAGES FROM A COMPUTER VIA TELEPHONE

BACKGROUND OF THE INVENTION

1. Field of the Invention

The invention relates to a method and device for obtaining retail price information in different languages from a computer via telephone for selected goods or services.

2. Description of Related Art

The use of computer programs in assisting in the purchase of goods and services is well known in the art. Computers are uniquely suited for automated calculations and comparisons between a large number of retailers and all kinds of goods and services.

However, the use of a computer in purchasing goods and services generally requires a computer terminal linked to a database to access the results of a computer analysis. This situation means that someone in a car, or otherwise without access to a terminal, cannot obtain the benefit of computer analysis for price comparisons. Furthermore, a blind person would also be unable to read a printed computer analysis or see an analysis on a display terminal. Also, a person who cannot read English would be unable to understand a computer analysis printed or displayed in that language. In addition, even at the threshold of the twenty-first century, there are people who are uncomfortable with interaction with a computer via a terminal, yet would benefit from the service that a computer analysis of retail prices can provide.

Computer programs involving retail shopping are known in the art. U.S. Pat. No. 5,890,139 to Suzuki et al. teaches an on-line shopping system. However, it teaches through interaction via a computer terminal and display. Also, U.S. Pat. No. 4,992,940 to Dworkin requires a computer terminal and a visual display. Furthermore, the system does not teach the selection of a language for interaction with the program.

Other references teach the changing of a computer display to a selected foreign language. U.S. Pat. Nos. 4,135,662 and 4,584,648 to Dlugos teach postage scales that visually display prompts in a selected language. Similarly, in U.S. Pat. No. 5,009,276 to Raikes, a postal scale displays prompts and issues reports in a selected language. In U.S. Pat. No. 5,155,849 to Westfall, et al., a user can change the language in the display of a reproduction machine. No provision in any of this art is made for a user to select a language via a telephone, nor is there any provision to make and output price comparisons in the selected language.

Similarly, U.S. Pat. No. 4,595,980 to Innes teaches a data processing system which allows concurrent multilingual use by a plurality of users. Innes provides for data collection prompts and message displays in user-specified languages. However, the invention fails to provide for verbal interaction with the user, via telephone or otherwise.

U.S. Pat. Nos. 5,220,501 and 5,870,724 to Lawlor et al. teach a banking system using an ATM-like terminal that can be part of a telephone. However, neither of these references teach any multilingual uses, nor is verbal communication between the computer and the user suggested.

The present invention would benefit someone who is unaware of the differences in price of items at various locations and wants to be sure that a specific location carries the item at the lowest price. For example, the present invention would benefit someone in the middle of a shopping trip who goes to a store only to find that a store no longer carries the item. A person without the invention would be unable to get a computerized comparison of the prices of the desired goods or services. That person would be forced to go to different stores, not knowing the prices beforehand, or even if that store carried the desired items. The problem is more acute for people that do not speak English fluently.

As a result, much of a shopper's time is wasted on unnecessary trips to stores that may not have the needed items. The shopper also wastes money, since the shopper may be spending significantly more for an item that may be offered for less nearby. In addition, a blind shopper cannot obtain a computer analysis of the prices of goods or services without specialized equipment. Furthermore, shoppers who do not speak fluent English are forced to make these comparisons in a language foreign to them and are unable to get the information needed to purchase the desired items for the lowest price.

Presently, a shopper that is not near a terminal or does not use one must call several stores in an area to get prices. This involves several telephone calls, which requires dialing several numbers or requires much time searching telephone directories. Also, someone not familiar with comparable retail chains may miss some stores which would have the item at the lowest price. Again, calling a number of stores is not a viable option for a shopper that is not fluent in English.

A store without the item may direct the shopper to another competing store. However, the shopper is dependent upon the first store's good will. In addition, as described above, the shopper would still have to make a second call to the second store to determine the price there. However, if the second store is closed, a shopper would be unable to get the price comparison, and would have wasted that second call.

The solution is to have a computer program which the shopper can access via telephone to get a price comparison on specific goods and services. Using means such as an interactive voice recognition program, the system guides the shopper to select the language of choice. From there, the system guides the shopper in the selected language to input location criteria. Then the system guides the shopper through menu choices that allow the shopper to select specific goods or services. Once the selection is complete, the system, still in the selected language, provides the shopper with a list of the stores which have the selected item. The list may be organized by price or by location. The shopper could conveniently pay for the service through a fee based telephone number such as a 900-number or via a prepaid telephone card, credit card or debit card. If the shopper still cannot find the item on the list, the shopper can obtain live assistance. The shopper may also include location criteria to narrow the selection of stores.

The program would be available to a shopper regardless of store hours. Also, a store could specifically list itself on the system for a specific good or service to ensure that the public is aware that the store carries the item.

There are many potential users for this novel invention. It provides the ability to conveniently comparison shop with a single telephone call. Shoppers unable or unwilling to get to a computer terminal while shopping may use this invention to get the best price possible. This invention would especially be useful to blind people. Furthermore, the invention is useful to shoppers that speak different languages, especially to those that are not familiar with a particular area.

SUMMARY OF THE INVENTION

The present invention is a device for obtaining retail price information from different stores using a touch-tone telephone. The information is stored in a computer and is available to the user in different languages. The invention is also the computer program for operating the device. In addition, the invention is the method of using the device.

The device of the present invention is a device for obtaining retail price information in different languages from a computer via telephone. The device includes a central processing unit (CPU) having a memory operatively connected to the CPU, the memory having a program to be executed by the CPU.

The program in the preferred embodiment of the device is adapted to provide a choice of languages from which a user can communicate with the device via telephone and for receiving the choice of languages selected by the user. In an alternative embodiment, the program is menu-driven and responds to touch-tone input on the telephone. In another alternative embodiment, the program is menu-driven and responds to a user's voice.

In still alternative embodiment, telephone access to the CPU is obtained through the use of a fee based telephone number. In yet another embodiment, telephone access to the CPU is obtained through the use of a prepaid phone card account.

The program in the preferred embodiment of the device is further adapted to receive via telephone from the user goods and services criteria and to output via the telephone retail price information for the inputted retail goods and services criteria, the retail price information being outputted in the selected language. In an alternative embodiment, the program is further adapted to receive input of location criteria and to output retail price information for the inputted retail goods and services criteria in the selected language for the location criteria inputted.

The preferred embodiment also includes a communications port linked to the CPU, a modem linked to the communications port for inputting criteria and outputting retail price information via telephone and means for inputting a retail price information database into the memory.

In yet another alternative embodiment, the device further comprises a telephone operator station, wherein the program additionally has means for the user to transfer from the program to the telephone operator station so the user obtains live assistance.

The preferred embodiment of the program of the invention includes means for a user to access a central processing unit via telephone. In an alternative embodiment, telephone access to the program is obtained through the use of a fee based telephone number. In another embodiment, telephone access to the program is obtained through the use of a prepaid phone card account.

The preferred embodiment of the program also includes means for outputting via the telephone guidance for a user to input a language selection criteria for selecting a language for the computer to use to communicate with the user. In an alternative embodiment, the program is menu-driven and responds to touch-tone input on the telephone. In another embodiment, the program is menu-driven and responds to input from the user's voice.

The program in the preferred embodiment further includes means for receiving the language selection criteria via the telephone; means for outputting via the telephone in the selected language guidance for the user to input retail goods and services criteria; means for receiving retail goods and services criteria via the telephone; means for outputting via the telephone in the selected language guidance for a user to input location criteria; means for receiving the location criteria via the telephone; and means for outputting via the telephone in the selected language retail price information corresponding to the user's input of retail goods and services criteria and location criteria.

In yet another embodiment of the program of the invention, the program includes a telephone operator station, wherein the program additionally has means for the user to transfer from the program to the telephone operator station so the user obtains live assistance.

DETAILED DESCRIPTION OF THE INVENTION

Figure 1:
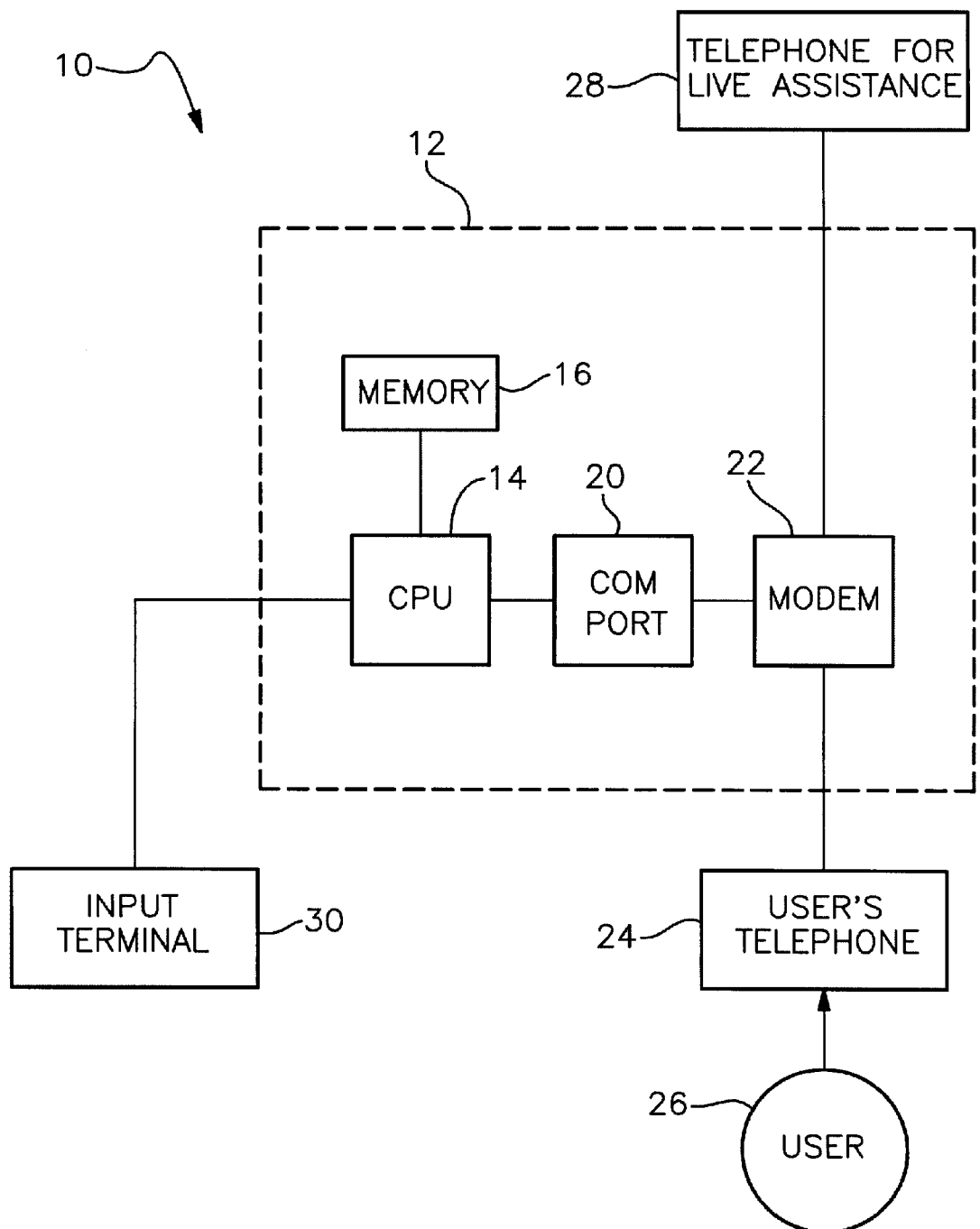
FIG. 1 is a block diagram of the invention, describing the necessary hardware.

FIG. 1 is a block diagram of the inventive device, generally depicted as 10. The device includes a computer 12 which includes a central processing unit (CPU) 14 which performs the processing functions of the computer 12. The computer 12 also includes memory 16 which comprises read-only memory and random access memory. The memory 16 is used to store at least some or all of a computer program 18, which will be described in FIG. 2. The program 18 is entered into the memory 16 by means known in the art by a programmer or systems administrator. The computer 12 also has a communications port 20 which enables the CPU 14 to communicate with the modem 22.

The modem 22 provides the CPU 14 with access to information from the user's telephone 24. In addition, the computer 12, via the communications port 20 and the modem 22, may provide the user 26 with means to communicate via telephone 24 to a means for providing live assistance 28 at any point during communication between the user 26 and the computer 12. Illustrated in FIG. 1, live assistance is made available via an operator with a telephone hooked to the modem 22. However, other means for providing a user 26 with access to live assistance are known, i.e., providing a telephone number to a live operator independent from the computer 12.

The computer 12 also has stored in its memory 16 a database of retail price information regarding goods and services. This database may be input into the memory 16 through the CPU 14 via a means for inputting information 30. Means for inputting the database include keying in information via a computer terminal connected to the computer 12. However, the database may be input by scanning bar code from the catalogs of stores or by a wholesale upload of information via the modem 22.

Figure 2:
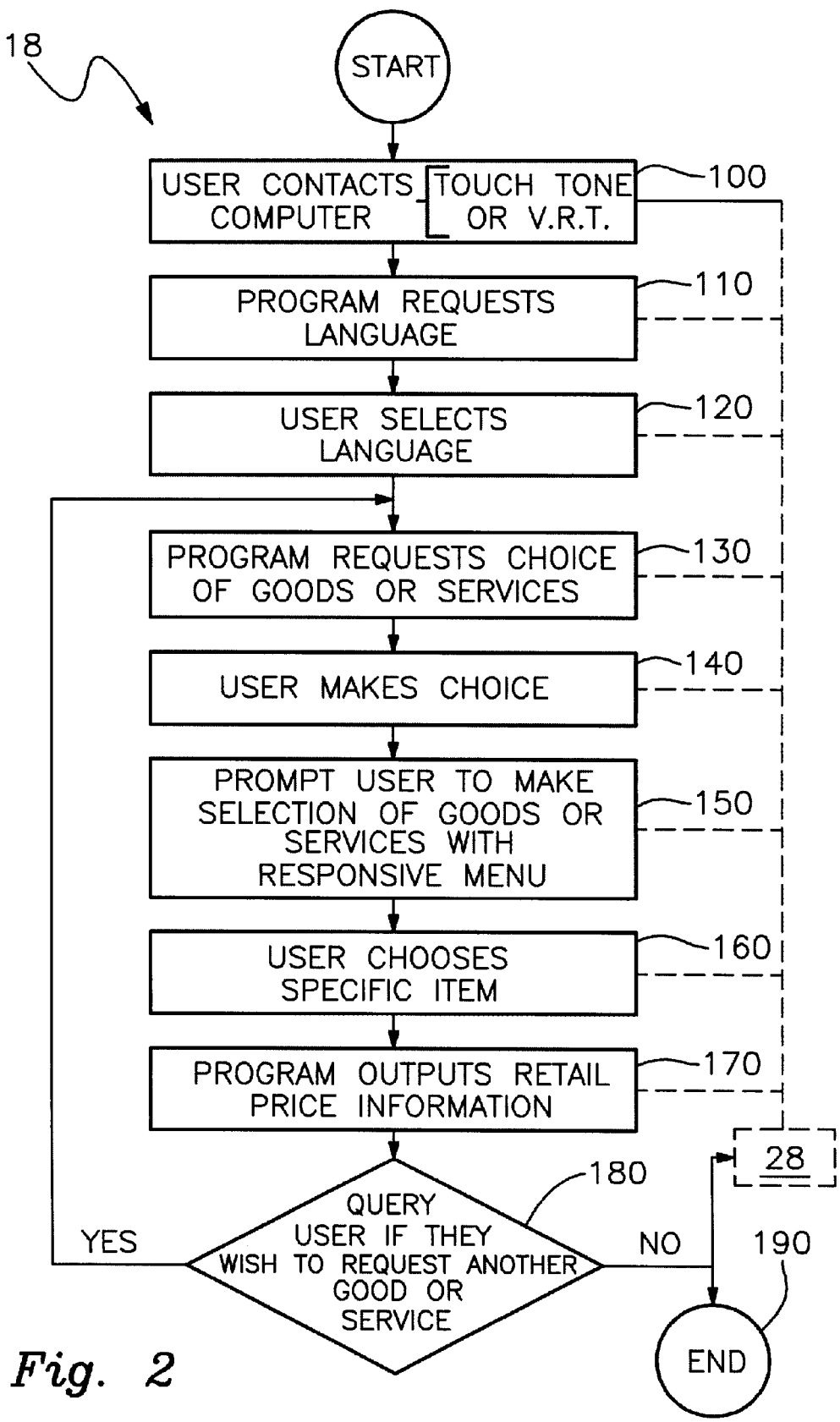
FIG. 2 is a flow chart of the relevant portions of the program.

The program 18 in FIG. 2 initiates when a user 26 contacts the computer 12 in block 100 via telephone 24. The program 18 may require the user 26 to dial a fee based telephone number such as a 900-number for access. Alternatively, access may be allowed via a prepaid calling card access number. A prepaid calling card of a type that may verbally inform a user 26 of how much time is available on the card is known in the art. Also, access may be provided through the means for providing live assistance 28, such as the presentation of a credit or debit card number. Upon contact, the program 18 verbally prompts the user to select a language for communication in block 110. The program 18 in the preferred embodiment is able to respond to touch-tone input. However, it is also possible that the program 18 would be able to respond to spoken input that corresponds to the touch-tone number, such as with an interactive voice response program that is, using voice recognition technology (V.R.T.), that understands simple spoken words.

The user 26 then selects a language in block 120. From that point, the program 18 communicates with the user 26 via the user's telephone 24 in the selected language. The program 18 then guides the user 26 to select goods or services criteria. For example, in block 130, the program 18 first requests the user 26 to select whether the user 26 is interested in finding the retail price of goods or services. The request is made in the language selected by the user 26. The user 26 then chooses goods or services in block 140.

The program 18 then guides the user 26, in the selected language, to narrow the type of goods or services selected with one or more responsive menus in block 150. The user 26 responds to the menu choices in block 160, until a specific good or service is requested for price comparison. Once the good or service is specified, the program 18 outputs retail price information in block 170. The retail price information includes the stores where the specified good or service can be purchased, and the corresponding prices. Optionally, this information may be organized by price, giving the lowest price first. Alternatively, the program 18 may also request location criteria such as a national region, state, zip code or area code. Location criteria would allow the list output at 170 to be shorter, and would allow the user 26 to obtain convenient locations to find the selected items, while still obtaining the lowest price. The location criteria may be requested and input at any time the user 26 is in contact with the program 18 after the language criteria has been input.

Optionally, after the program 18 outputs the retail price information, the program 18 may inquire whether the user 26 wishes to find retail price information on another good or service at block 180. Upon the user 26 indicating "YES" the program would then recycle to block 130, to a point where the user 26 makes the initial narrowing of the selected good or service. The program would thereby continue to communicate with the user 26 in the selected language until the user 26 terminates his or her queries by indicating "NO" and exiting the program 18 at 190 (FIG. 2).

Furthermore, at each point in the program 18 for which a user 26 response is required, the program 18 may optionally permit the user 26 to exit the program 18 at 190 of FIG. 2, and connect with means for providing live assistance 28. Assistance may be in the form of a live operator at a station with access to the program 18. The operator may give assistance to the user 26 in the selected language.

As seen from the foregoing description, the present invention satisfies a long felt need to provide a device which will provide retail price information in a selected language from a computer via telephone, thereby providing valuable cost and time savings to a shopper, providing the blind with a convenient method for comparison shopping, and providing a retailer with a method of advertising a specific good or service on a system designed for speakers of the selected language.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween. Moreover, of the following claims, the dependent claims are hereby asserted to be independently patentable from the independent claims.

Now that the invention has been described,

What is claimed is:

1. A device for obtaining retail price information in different languages from a computer via telephone, comprising:

a central processing unit (CPU) having a memory operatively connected to the CPU, the memory having a program to be executed by the CPU;

wherein the program is adapted to provide a choice of languages from which a user can communicate with the device via telephone and for receiving the choice of languages selected by the user;

wherein the program is further adapted to receive via telephone from the user goods and services criteria and to output via the telephone retail price information for the inputted retail goods and services criteria, the retail price information being outputted in the selected language;

a communications port linked to the CPU;

a modem linked to the communications port for inputting criteria and outputting retail price information via telephone; and means for inputting a retail price information database into the memory.

2. The device of claim 1, wherein telephone access to the CPU is obtained through the use of a fee based telephone number.

3. The device of claim 1, wherein telephone access to the CPU is obtained through the use of a prepaid phone card account.

4. The device of claim 1, wherein the program is menu-driven and responds to touch-tone input on the telephone.

5. The device of claim 1, wherein the program is menu-driven and responds to a user's voice.

6. The device in claim 1, further comprising a telephone operator station, wherein the program additionally has means for the user to transfer from the program to the telephone operator station so the user obtains live assistance.

7. The device of claim 1, wherein the program is further adapted to receive input of location criteria and to output retail price information for the inputted retail goods and services criteria in the selected language for the location criteria inputted.

8. The device of claim 7, wherein the program is menu-driven and responds to touch-tone input on the telephone.

9. The device of claim 7, wherein the program is menu-driven and responds to a user's voice.

10. A computer program comprising:

means for inputting and updating a database of retail price information regarding retail goods and services in a computer, the computer having a central processing unit and said retail price information database being capable of being accessed by pre-categorized retail goods and services criteria, including location criteria;

means for a user to access a central processing unit via a telephone;

means for outputting, via the telephone, guidance for a user to input a language selection criteria for selecting a language for the computer to use to communicate with the user;

means for receiving the language selection criteria via the telephone;

means for outputting, via the telephone in the selected language, guidance for the user to input retail goods and services criteria;

means for receiving the retail goods and services criteria via the telephone;

means for outputting via the telephone in the selected language guidance for the user to input location criteria;

means for receiving the location criteria via the telephone; and means for outputting, via the telephone in the selected language, retail price information corresponding to the user's input of retail goods and services criteria and location criteria, wherein the user obtains the desired retail price information based on the selected criteria for retail goods and service.

11. The program of claim 10, wherein the program is menu-driven and responds to touch-tone input on the telephone.

12. The program of claim 10, wherein the program is menu-driven and responds to input from the user's voice.

13. The program of claim 10, further comprising a telephone operator station, wherein the program additionally has means for the user to transfer from the program to the telephone operator station so the user obtains live assistance.

14. The program of claim 10, wherein telephone access to the program is obtained through the use of a fee based telephone number.

15. The program of claim 10, wherein telephone access to the program is obtained through the use of a prepaid phone card account.

16. A method for a program to output via telephone retail price information in different languages, comprising the steps of:

providing a computer having a central processing unit, the central processing unit having memory means operatively connected to the central processing unit, and the central processing unit further having means for inputting, including updating, a database of retail price information for retail goods and services in the computer, said database being capable of being accessed by pre-categorized retail goods and services criteria, including location criteria;

providing a user with access to the program via a telephone;

outputting via the telephone guidance for a user to input a language selection criteria for selecting a language for the computer to use to communicate with the user;

receiving the language selection criteria via the telephone;

outputting via the telephone in the selected language guidance for the user to input retail goods and services criteria;

receiving retail goods and services criteria via the telephone; and outputting via the telephone in the selected language retail price information corresponding to the user's input of retail goods and services criteria, wherein the user obtains the desired retail price information based on the selected criteria for retail goods and service.

17. The method of claim 16, further comprising the steps of:

outputting, via the telephone in the selected language, guidance for a user to input location criteria;

receiving input of location criteria; and outputting the retail price information for the inputted retail goods and services criteria in the selected language for the location criteria inputted.

18. The method of claim 16, further comprising the step of:

accessing the CPU through the use of a fee based telephone number.

19. The method of claim 16, further comprising the step of:

accessing the CPU through the use of a prepaid phone card account.

20. The method of claim 16, further comprising the step of:

providing means for the user to transfer from the program to a means for obtaining live assistance.

* * * * *